Patented Apr. 22, 1952

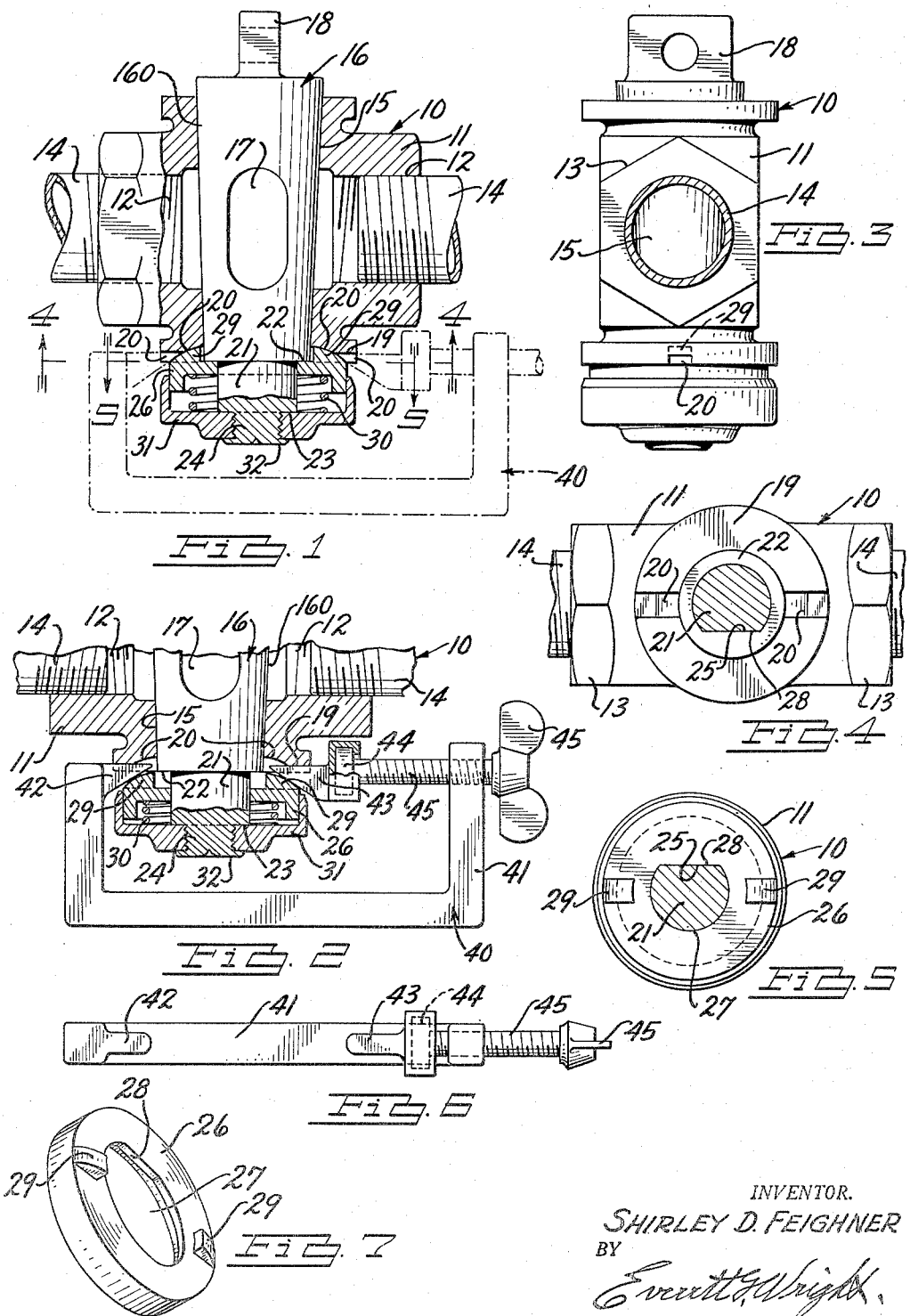

2,594,141

UNITED STATES PATENT OFFICE 2,594,141

LOCKING GAS VALVE

Shirley D. Feighner, Wayne County, Mich.

Application October 22, 1948, Serial No. 56,029

2 Claims. (Cl. 251—164)

This invention relates to self-locking valves and in particular to self-locking gas valves, oil valves, water valves and the like.

In gas, water and other public utility services, and in piping where service is desired to be shut "off" and maintained "off," the shut-off valve is ofttimes wired in its closed position and then sealed by impressing a lead or other type of seal or wafer on the sealing wire employed. This means serves only as a telltale in the event the sealing wire is removed to "open" the valve.

Public utility and other services and institutions lose hundreds of thousands of dollars annually as a result of the withdrawal of gas, steam, oil, water, gasoline and the like from lines that have been shut "off" but which are tampered with by unauthorized persons.

With the foregoing in view, the primary object of the invention is to provide, in a gas valve or like valve, means for automatically locking the valve when turned to its "off" position which is relatively obscure and which valve can only be turned "on" again by the application and use of a specific tool.

Another object of the invention is to provide a self-locking valve which may be turned "off" at any time, which automatically becomes "locked" in its "off" position, which can only be turned "on" by wedging uniformly at specific points at opposite sides of the valve, which will bind in its "locked off" position if not wedged uniformly to its "release" position, and which requires a specific type of tool to "release" from its "locked" position to permit it to be turned "on" after once being turned "off."

A further object of the invention is to provide a self-locking valve having features heretofore mentioned which may be easily and readily applied to standard types of tapered stemmed gas valves and the like at little expense and with assurance that only a properly equipped mechanic having the necessary know-how may "open" the valve once it has been shut "off."

Other objects of the invention will become apparent by reference to the following detailed description taken in connection with the accompanying drawings, in which:

Fig. 1 is a vertical longitudinal sectional view of a self-locking gas valve embodying the invention showing the tapered valve plug thereof "locked" in its "off" position, the specific tool required to "unlock" the tapered valve plug being indicated in dot and dash lines.

Fig. 2 is a fragmentary sectional view similar to Fig. 1 showing the tapered valve plug of the self-locking gas valve "unlocked" in its "off" position ready to be turned "on," the specific tool employed to "unlock" the tapered valve plug being shown in operating position.

Fig. 3 is an end elevational view of the self-locking gas valve disclosed in Figs. 1 and 2.

Fig. 4 is a horizontal sectional view of the body and tapered valve plug of the self-locking gas valve taken on the line 4—4 of Fig. 1 looking in the direction indicated by the arrows.

Fig. 5 is a horizontal sectional view of the self-locking gas valve taken on the line 5—5 of Fig. 1 looking in the direction indicated by the arrows.

Fig. 6 is a top plan view of the specific tool required to "unlock" the self-locking gas valve from its "locked off" position.

Fig. 7 is a view in perspective of the locking element of the locking assembly preferably employed.

Referring now to the drawing wherein like numerals refer to like and corresponding parts throughout the several views, the particular embodiment of the invention disclosed for the purposes of illustration is shown in connection with a gas valve 10 composed of a housing 11 having longitudinally disposed threaded apertures 12 in the hexagon ends 13 thereof into which piping 14 is threaded, the said housing 11 also having a tapered aperture vertically therethrough forming a tapered seat 15 into which a complementary tapered shut-off element 16 is rotatably mounted. The said shut-off element 16 is preferably provided with a vertically slotted aperture 17 therethrough and a rectangular key 18 on the top thereof by means of which the shut-off element 16 may be rotated from its "off" position shown in Fig. 1 to its "on" position at right angles thereto.

The bottom annular face 19 of the valve housing 11 is machined or ground smooth as indicated in Fig. 4, and is provided with a pair of diametrically disposed grooves 20. The bottom of the tapered shut-off element 16 is provided with an axially disposed cylindrical stem 21 which is smaller in diameter than the base of the tapered portion 16a of the said shut-off element 16 forming a shoulder 22. The said stem 21 of the shut-off element 16 is again reduced in size at the lower end thereof forming a second shoulder 23 and a cylindrical nib 24 which is threaded. One side of the said cylindrical stem 21 is preferably flattened to form a key indicated by the numeral 25.

A cupped locking element 26 having an aperture 27 axially therethrough formed at 28 to telescope neatly over and become keyed to the stem 21 of the tapered shut-off element 16 is provided with a pair of locking ears 29 which are formed to become disposed into the said diametrically disposed grooves 20 formed in the annular bottom 19 of the valve housing 11.

The said cupped locking element 26 is telescoped in keyed relationship onto stem 21 of the shut-off element 16 with the locking ears 29 thereof disposed in the grooves 20 in the annular bottom 19 of the valve housing 11. A compression spring 30 is then telescoped over the stem 21 of the shut-off element 16. A cup shaped cap 31 which telescopes neatly over the outside of the cupped locking element 26 is then threaded onto the threaded cylindrical nib 24 of the shut-off element 16 to refusal against the shoulder 23, and is locked onto the said locking element 26 by peening as indicated by the numeral 32.

The construction constantly urges the locking ears 29 of the cup shaped locking element 26 toward and against the annular bottom face 19 of the valve housing 11. When the shut-off element 16 of the valve 10 is turned to its "off" position as indicated in Fig. 1, the locking ears 29 drop into the grooves 20 provided in the bottom face 19 of the valve housing 11 whereupon it is impossible to turn the shut-off element 16 from its "off" position to its "open" position without employing a specific tool to spring the locking element 26 to a position where the locking ears 29 thereof are out of engagement with the valve housing 11. Thus, it will be observed, that when the shut-off element 16 of the valve 10 is in any position except its "off" position, the locking ears 29 of the locking element 26 ride on the annular face 19 of the valve housing 11. The mere turning of the shut-off element 16 to its "off" position automatically locks the valve 10 "off."

As best indicated in Figs. 1, 2 and 6, an unlocking tool 40 is employed to urge the locking element 26 out of its locked position wherein it is held by the compression spring 30. Because of the fact that the base of the cup shaped locking element 26 is rather thin and because it is keyed to and fits neatly over the stem 21 of the shut-off element 16, the said cup shaped locking element 26 must be moved axially along the said stem 21 of the shut-off element 16 or it will bind. This prevents prying the cup shaped locking element 26 away from the annular face 19 of the valve housing 11 from only one side of the valve. The particular and specific unlocking tool 40 is in the order of a C-clamp composed of a C-frame 41 having a tapered wedge 42 fixed at one end thereof facing a like tapered wedge 43 journaled on the cylindrical end 44 of a thumb-screw 45 threaded through the other end of the said C-frame 41. The tapered wedges 42 and 43 are oppositely disposed and are preferably provided with a curved blunt nose and are formed the width of the locking ears 29 of the locking element 26, the grooves 20 formed in the annular bottom 19 of the valve housing 11 being slightly wider.

Fig. 1 shows the shut-off valve element 16 in its "off" position and locked in its "off" position by the locking element 26. The unlocking tool 40 is shown in Fig. 1 in dot and dash lines positioned to unlock the shut-off valve element 16. Fig. 2 shows the unlocking tool 40 urged by turning the thumb screw 45 thereof into the grooves 20 formed in the bottom of the valve housing 11 and separating the locking element 26 from the bottom 19 of the valve housing 11 sufficiently to permit the shut-off valve element 16 to be rotated to its "on" position which is ninety degrees with respect to its "off" position shown in Figs. 1 and 2. After the shut-off valve element 16 is turned from its "off" position, the locking ears 29 of the locking element 26 ride on the annular bottom 19 of the valve housing 11, and the unlocking tool 40 is removed.

Anyone tampering with a self-locking valve embodying the invention who does not have the unlocking tool 40 or the know-how would jamb the locking element 26. The self-locking valve as herein provided is inexpensive and does not require keys or a master-key set-up which is prohibitive in cost and cumbersome in public utility operations. The use of valves embodying the invention does not preclude the use of the wire and sealing wafer type of sealing "off" presently employed and can be used conjointly therewith. The use of self-locking valves embodying the invention obviously will materially reduce and substantially eliminate the unauthorized opening of service valves for gas, water, oil and the like, once they have been shut "off."

Although but a single embodiment of the invention has been disclosed and described in detail, it is obvious that many changes may be made in the size, shape, arrangement and detail of the several elements of the invention without departing from the spirit and scope thereof as defined by the appended claims.

I claim:

1. In a valve of the class described, a valve housing including a tapered shut-off element rotatably mounted therein, an axially disposed cylindrical stem extending from the bottom of the said tapered shut-off element formed to serve as a key and reduced in size at its lower end, the bottom of the said valve housing being provided with an annular face having diametrically disposed notches formed therein extending through the outer periphery of the said housing, a cupped locking element including a pair of locking ears formed to enter the said notches in the said housing when in registry therewith reciprocatingly mounted on the cylindrical stem of the said tapered shut-off element and keyed thereto for rotation therewith, a cup shaped cap telescoping neatly over the outside of the said cupped locking element fixed on the lower end of the cylindrical stem of the said shut-off element, and a compression spring disposed around the cylindrical stem of the said shut-off element interposed between the locking element and the cap thereover constantly urging the said locking ears of the said locking element against the bottom of the valve housing or into the notches therein when the shut-off element is rotated to bring the said locking ears of the locking element in registry therewith, the said locking ears of the locking element being so formed as to accommodate like oppositely disposed tapered wedges for moving the locking element axially out of the notches in the bottom of the said valve housing when applied diametrically from both sides of the valve housing, the said locking ears and notches being complementarily formed whereby to admit of moving the locking ears out of the notches in the valve housing responsive only to like oppositely disposed wedges applied simultaneously in the said notches, the clearance between the cupped locking element and the stem of the shut-off element being such as will cause the locking element to bind on the stem of the shut-off element if the wedging of the locking element is accomplished in other than a uniform manner from both sides of the valve simultaneously.

2. In a valve of the class described, a valve housing including a shut-off element rotatably mounted therein, a cylindrical stem extending from the said tapered shut-off element, the said valve housing adjacent the said cylindrical stem having diametrically disposed notches formed therein, a locking element including a pair of locking ears formed to enter the said notches in the said housing when in registry therewith reciprocatingly mounted on and keyed to the cylindrical stem of the said shut-off element, a cap telescoping neatly over the outside of the said locking element fixed on the lower end of the cylindrical stem of the said shut-off element, and a compression spring interposed between the locking element and the cap thereover constantly urging the said locking ears of the said locking element into the notches in the said valve housing when the shut-off element is rotated to bring the said locking ears of the locking element in registry therewith, the said locking ears and notches being complementarily formed whereby to admit of moving the locking ears out of the notches in the valve housing responsive to like oppositely disposed wedges applied simultaneously in the said notches, the clearance between the cupped locking element and the stem of the shut-off element being such as will cause the locking element to bind on the stem of the shut-off element if the wedging of the locking element is accomplished in other than a uniform manner from both sides of the valve simultaneously.

SHIRLEY D. FEIGHNER.

REFERENCES CITED

The following references are of record in the file of this patent:

UNITED STATES PATENTS

| Number | Name | Date |
|---|---|---|
| 1,242,392 | Underwood | Oct. 9, 1917 |
| 1,707,007 | Harper | Mar. 26, 1929 |
| 2,120,695 | Dlesk | June 14, 1938 |
| 2,217,963 | Mueller | Oct. 15, 1940 |